(12) United States Patent
Hikita et al.

(10) Patent No.: US 7,961,918 B2
(45) Date of Patent: Jun. 14, 2011

(54) PERSONAL IDENTIFICATION DEVICE AND ELECTRONIC APPARATUS PROVIDED THEREWITH

(75) Inventors: Junichi Hikita, Kyoto (JP); Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1006 days.

(21) Appl. No.: 11/774,992

(22) Filed: Jul. 9, 2007

(65) Prior Publication Data

US 2008/0008365 A1 Jan. 10, 2008

(30) Foreign Application Priority Data

Jul. 10, 2006 (JP) .................................. 2006-189473

(51) Int. Cl.
*G06K 9/00* (2006.01)
(52) U.S. Cl. .......................... 382/124; 382/125; 382/115
(58) Field of Classification Search .................. 382/115, 382/124, 125
See application file for complete search history.

(56) References Cited

U.S. PATENT DOCUMENTS

| 6,970,234 | B2 * | 11/2005 | Nagasaka et al. | 356/71 |
|---|---|---|---|---|
| 7,123,755 | B2 * | 10/2006 | Shigeta | 382/124 |
| 7,366,331 | B2 * | 4/2008 | Higuchi | 382/124 |
| 7,609,864 | B2 * | 10/2009 | Nagasaka et al. | 382/124 |
| 7,620,212 | B1 * | 11/2009 | Allen et al. | 382/115 |
| 2003/0118219 | A1 | 6/2003 | Higuchi et al. | |
| 2006/0072795 | A1 | 4/2006 | Sano et al. | |
| 2006/0098848 | A1 | 5/2006 | Nagasaka et al. | |
| 2009/0074263 | A1 | 3/2009 | Higuchi | |

FOREIGN PATENT DOCUMENTS

| JP | 2002-230553 | 8/2002 |
|---|---|---|
| JP | 2003-141514 | 5/2003 |
| JP | 2003-263640 | 9/2003 |
| JP | 2004-054698 | 2/2004 |
| JP | 2004-154546 | 6/2004 |
| JP | 2005-168627 | 6/2005 |
| JP | 2006-106979 | 4/2006 |
| JP | 2006-155575 | 6/2006 |
| JP | 2006-158952 | 6/2006 |

* cited by examiner

*Primary Examiner* — Bhavesh M Mehta
*Assistant Examiner* — Stephen R Koziol
(74) *Attorney, Agent, or Firm* — Fish & Richardson P.C.

(57) ABSTRACT

A personal identification device has: a light source portion that emits infrared light with a first wavelength at the time of reading a vein pattern, and emits infrared light with a second wavelength longer than the first wavelength at the time of reading a fingerprint pattern; a light receiving sensor portion that detects a component of the infrared light reflected from a fingertip after being shone thereon from the light source portion; an amplifying portion that amplifies a detection signal obtained by the light receiving sensor portion; an A/D converting portion that converts an analog signal obtained by the amplifying portion into a digital signal; a data distributing portion that distributes the digital signal obtained by the A/D converting portion into two groups of data, of which one is vein pattern data and the other is fingerprint pattern data; and a processing portion that verifies the identity of a person based on the vein pattern data and the fingerprint pattern data distributed by the data distributing portion.

12 Claims, 8 Drawing Sheets

_US 7,961,918 B2_

PERSONAL IDENTIFICATION DEVICE AND ELECTRONIC APPARATUS PROVIDED THEREWITH

This application is based on Japanese Patent Application No. 2006-189473 filed on Jul. 10, 2006, the contents of which are hereby incorporated by reference.

BACKGROUND OF THE INVENTION

1. Field of the Invention

The present invention relates to personal identification devices that verify the identity of a person by checking both a fingerprint pattern and a vein pattern, and relates to electronic apparatuses (such as cellular phone terminals) provided with such personal identification devices.

2. Description of Related Art

In recent years, personal identification devices that check unique biometric information (such as fingerprint patterns, vein patterns, irises, voice patterns, faces, and the shape of hands), instead of passwords or the contents recorded in IC cards, for verifying the identity of a person have come to be used not only in automatic teller machines, electronic commerce systems, and door lock systems for homes and automobiles but also in electronic apparatuses such as cellular phone terminals.

Such a personal identification device checks biometric information that is more difficult to fake than the passwords or IC cards, making it harder for malicious persons to pretend to be someone they are not. This helps greatly improve the security of a system incorporating such a device.

As an example of a conventional technology related to what has been described thus far, various personal identification devices that verify the identity of a person by checking both a fingerprint pattern and a vein pattern have been disclosed and proposed, for example, in JP-A-2005-168627, JP-A-2004-154546, JP-A-2004-054698, JP-A-2003-263640, and JP-A-2002-230553.

The above-mentioned conventional personal identification devices are in general so configured as to read a fingerprint pattern by detecting a component of visible light reflected from the fingertip after being shone thereon and to read a vein pattern by detecting a component of near-infrared light passing through the fingertip or palm after being shone thereon.

Certainly, with the personal identification device that verifies the identity of a person by checking both a fingerprint pattern and a vein pattern, as compared with a configuration in which fingerprint pattern check and vein pattern check are separately performed, it is possible to improve the accuracy of personal identification.

However, with respect to the conventional personal identification device, the following problem arises. As mentioned above, with the conventional personal identification device being so configured as to read a vein pattern by using infrared light and to read a fingerprint pattern by using visible light, there is a possibility that the accuracy with which to read a fingerprint pattern is reduced under circumstances where the light receiving sensor is exposed to natural light (ambient light). This hinders efficient pattern recognition.

In particular, small electronic apparatuses (for example, cellular phone terminals) whose limited space makes it difficult to take structural measures such as covering the light receiving sensor with a light-shielding cover may easily suffer from the above-described problem because, when reading a fingerprint pattern, the natural light easily leaks in the light receiving sensor through a gap between the light receiving sensor and the fingertip.

SUMMARY OF THE INVENTION

In view of the conventionally experienced problems described above, an object of the present invention is to provide personal identification devices that can improve the accuracy of personal identification by improving the accuracy with which to read a fingerprint pattern and a blood vessel pattern, and to provide electronic apparatuses provided with such personal identification devices.

To achieve the above object, according to one aspect of the present invention, a personal identification device is provided with: a light source portion that emits infrared light with a first wavelength at the time of reading a blood vessel pattern, and emits infrared light with a second wavelength longer than the first wavelength at the time of reading a fingerprint pattern; a light receiving sensor portion that detects a component of the infrared light reflected from a fingertip after being shone thereon from the light source portion; an amplifying portion that amplifies a detection signal obtained by the light receiving sensor portion; an analog/digital converting portion that converts an analog signal obtained by the amplifying portion into a digital signal; a data distributing portion that distributes the digital signal obtained by the analog/digital converting portion into two groups of data, of which one is blood vessel pattern data and the other is fingerprint pattern data; and a processing portion that verifies the identity of a person based on the blood vessel pattern data and the fingerprint pattern data distributed by the data distributing portion.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
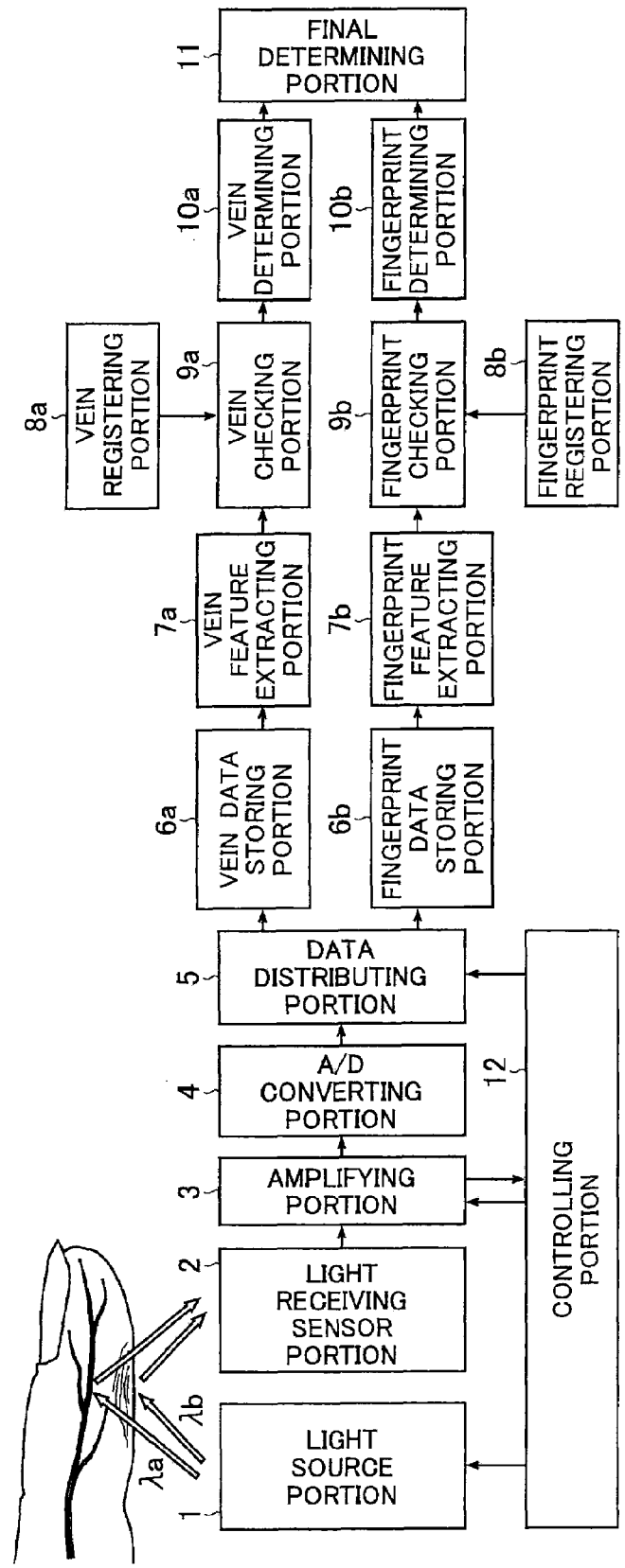
FIG. 1 is a block diagram showing an embodiment of a personal identification device according to the invention.

FIG. 1 is a block diagram showing an embodiment of a personal identification device according to the invention.

As shown in this drawing, the personal identification device of this embodiment includes a light source portion 1, a light receiving sensor portion 2, an amplifying portion 3, an analog/digital converting portion 4 (hereinafter an "A/D converting portion 4"), a data distributing portion 5, a vein pattern data storing portion 6a, a fingerprint pattern data storing portion 6b, a vein pattern feature extracting portion 7a, a fingerprint pattern feature extracting portion 7b, a vein pattern registering portion 8a, a fingerprint pattern registering portion 8b, a vein pattern checking portion 9a, a fingerprint pattern checking portion 9b, a vein pattern determining portion 10a, a fingerprint pattern determining portion 10b, a final determining portion 11, and a controlling portion 12.

This embodiment deals with a personal identification device in which the light source portion 1, the light receiving sensor portion 2, the amplifying portion 3, and the A/D converting portion 4 are integrated into a single semiconductor integrated circuit device. However, it is also possible to integrate any circuit portion described hereinafter as appropriate.

The light source portion 1 emits infrared light with a wavelength of $\lambda a$ when a vein pattern is read, and emits infrared light with a wavelength of $\lambda b$ that is longer than the wavelength of $\lambda a$ when a fingerprint pattern is read. The configuration and operation of the light source portion 1 will be described later in detail.

The light receiving sensor portion 2 detects a component of infrared light reflected from the fingertip after being shone thereon from the light source portion 1. The configuration and operation of the light receiving sensor portion 2 will be described later in detail.

The amplifying portion 3 amplifies a detection signal obtained by the light receiving sensor portion 2. The configuration and operation of the amplifying portion 3 will be described later in detail.

The A/D converting portion 4 converts analog signals obtained by the amplifying portion 3 into digital signals suitable for signal processing in a circuit provided in the following stage.

The data distributing portion 5 distributes the digital signals obtained by the A/D converting portion 4 into two groups of data, of which one is sent as vein pattern data to the vein pattern storing portion 6a and the other is sent as fingerprint pattern data to the fingerprint pattern data storing portion 6b.

The vein pattern data storing portion 6a stores, as a single vein pattern image, the vein pattern data obtained as a result of the digital signals being distributed by the data distributing portion 5 into two groups of data. The fingerprint pattern data storing portion 6b stores, as a single fingerprint pattern image, the fingerprint pattern data obtained as a result of the digital signals being distributed by the data distributing portion 5 into two groups of data.

The vein pattern feature extracting portion 7a extracts vein pattern features from the vein pattern data stored in the vein pattern data storing portion 6a. As the vein pattern features, the points where the veins intersect or branch off and the points where the bends in the veins change, for example, may be collectively extracted. The fingerprint pattern feature extracting portion 7b extracts fingerprint pattern features from the fingerprint pattern data stored in the fingerprint pattern data storing portion 6b. As the fingerprint pattern features, ridge ending, bifurcation, and the like, of fingerprint ridges may be collectively extracted.

The vein pattern registering portion 8a stores previously registered vein pattern features, and the fingerprint pattern registering portion 8b stores previously registered fingerprint pattern features.

The vein pattern checking portion 9a checks the match between the vein pattern features and the registered vein pattern features on an individual basis, and thereby calculating the degree of matching between them. The fingerprint pattern checking portion 9b checks the match between the fingerprint pattern features and the registered fingerprint pattern features on an individual basis, and thereby calculating the degree of matching between them.

The vein pattern determining portion 10a determines the similarity in vein pattern by comparing the check results (the degree of matching) obtained by the vein pattern checking portion 9a with a given threshold level. The fingerprint pattern determining portion 10b determines the similarity in fingerprint pattern by comparing the check results obtained by the fingerprint pattern checking portion 9b with a given threshold level.

The final determining portion 11 verifies the identity of a person (authenticates personal identification) based on the determination results obtained by the vein pattern determining portion 10a and the fingerprint pattern determining portion 10b. Advisably, criteria for personal identification are appropriately set with consideration given to both security and convenience. Examples of such criteria are as follows: both the similarity in vein pattern and the similarity in fingerprint pattern exceed 70%, or the similarity in vein pattern or fingerprint pattern exceeds 90%. In this case, advisably, the criteria values may be appropriately adjusted in accordance with the settings of the user.

Incidentally, the above-described vein pattern data storing portion 6a, fingerprint pattern data storing portion 6b, vein pattern feature extracting portion 7a, fingerprint pattern feature extracting portion 7b, vein pattern registering portion 8a, fingerprint pattern registering portion 8b, vein pattern checking portion 9a, fingerprint pattern checking portion 9b, vein pattern determining portion 10a, fingerprint pattern determining portion 10b, and final determining portion 11 can each be regarded as a component of a processing portion that verifies the identity of a person based on the two groups of data, namely the vein pattern data and the fingerprint pattern data, distributed by the data distributing portion 5.

The controlling portion 12 controls the overall operation of the personal identification device, among which especially important operation related to this invention is as follows. Depending on which pattern is read, a vein pattern or a fingerprint pattern, the controlling portion 12 performs switching control of the wavelength (the light-emitting element) of the light source portion 1, switching control of the gain of the amplifying portion 3, and switching control of the output line of the data distributing portion 5. The controlling portion 12 also performs feedback control of the output intensity of the light source portion 1 and the gain of the amplifying portion 3, so as to keep the level of an output signal of the amplifying portion 3 within a predetermined tolerance level.

As described above, with the personal identification device of this embodiment, by verifying the identity of a person by checking both a fingerprint pattern and a vein pattern, it is possible to reduce both the false acceptance rate (the rate at which a non-authorized person is incorrectly accepted as authorized) and the false rejection rate (the rate at which an authorized person is incorrectly rejected as non-authorized). In addition, with the personal identification device of this embodiment, by checking biometric information that is more difficult to fake than the passwords or IC cards, it is possible to make it harder for malicious persons to pretend to be someone they are not. This helps greatly improve the security of a system incorporating such a device.

Figure 2:
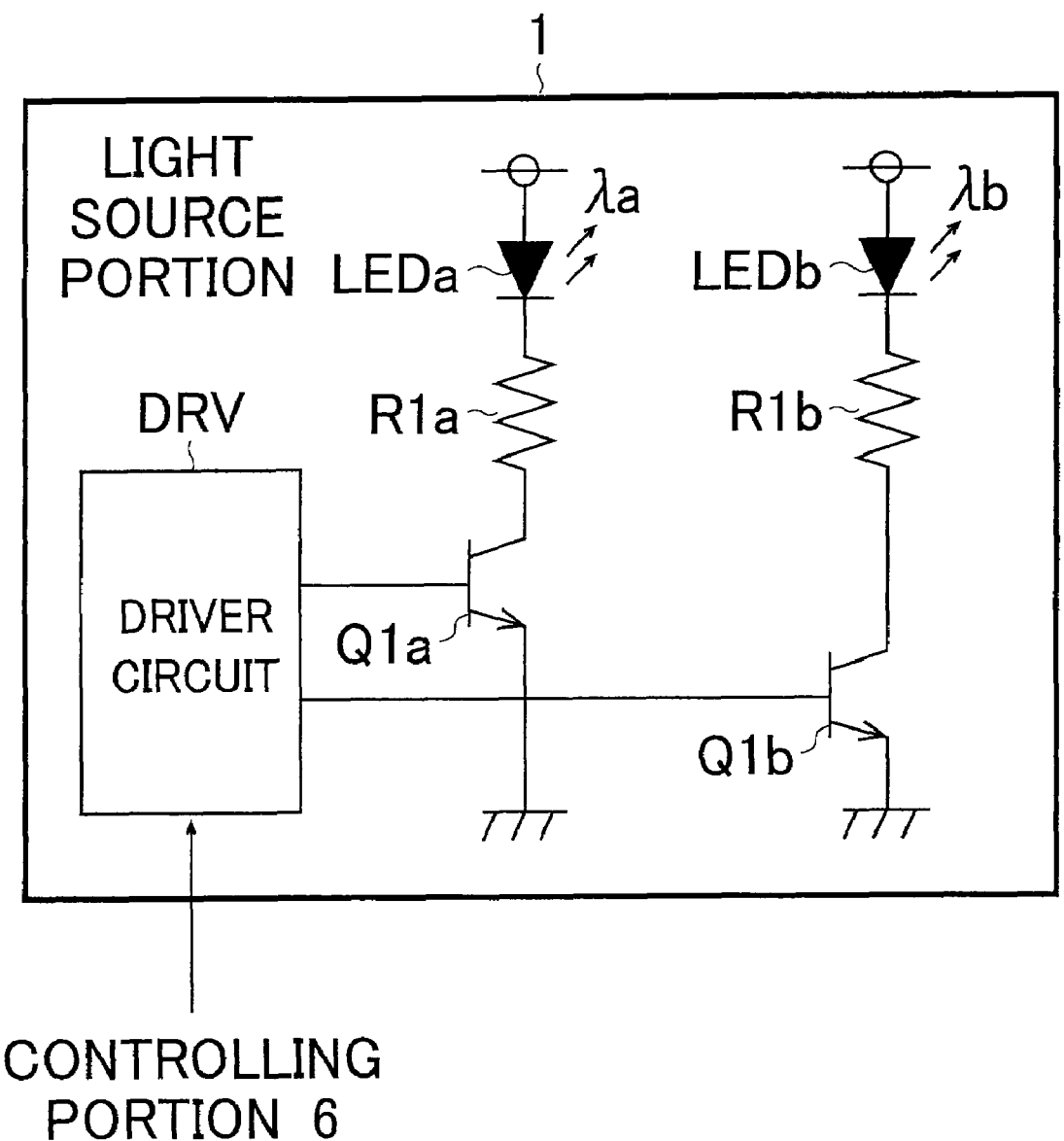
FIG. 2 is a circuit diagram showing an example of the configuration of a light source portion 1.

Next, with reference to FIG. 2, the configuration and operation of the light source portion 1 will be described in detail. FIG. 2 is a circuit diagram showing an example of the configuration of the light source portion 1.

As shown in this drawing, the light source portion 1 includes light-emitting diodes LEDa and LEDb, resistors R1a and R1b, npn bipolar transistors Q1a and Q1b, and a driver circuit DRV.

The anodes of the light-emitting diodes LEDa and LEDb are connected to the power supply line. The cathode of the light-emitting diode LEDa is connected via the resistor R1a to the collector of the transistor Q1a. The cathode of the light-emitting diode LEDb is connected via the resistor R1b to the collector of the transistor Q1b. The emitters of the transistors Q1a and Q1b are connected to the ground line. The bases of the transistors Q1a and Q1b are connected to a control signal output node of the driver circuit DRV.

The light-emitting diode LEDa emits infrared light (near-infrared light) with a wavelength of λa (in this embodiment, about 760 nm) when a vein pattern is read. The reason that the infrared light with a wavelength of about 760 nm is used for reading a vein pattern is as follows. The infrared light with a wavelength of about 760 nm is suitable for reading veins because it easily passes through body tissues while at the same time being easily absorbed into reduced hemoglobin (hemoglobin that has released oxygen) in erythrocytes.

The light-emitting diode LEDb emits infrared light with a wavelength of λb (in this embodiment, about 900 nm) when a fingerprint pattern is read. Incidentally, the infrared light with a wavelength of about 900 nm is widely used for infrared communication such as remote control. Thus, a light-emitting diode for infrared communication, for example, can also be used as the light-emitting diode LEDb.

As described above, with a configuration in which, instead of visible light, infrared light having a longer wavelength than that for reading a vein pattern is used at the time of reading a fingerprint pattern, it is possible to limit a wavelength range where the light receiving sensor portion 2 can receive light to an infrared wavelength range. This helps maintain the accuracy with which to read a fingerprint pattern even when the light receiving sensor portion 2 is exposed to natural light (ambient light).

Especially in small electronic apparatuses (for example, cellular phone terminals) whose limited space makes it difficult to take structural measures such as covering the light receiving sensor portion 2 with a light-shielding cover, the natural light easily leaks in the light receiving sensor portion 2 through a gap between the light receiving sensor portion 2 and the fingertip at the time of reading a fingerprint pattern. Even in this case, with the personal identification device of this embodiment, it is possible to read a fingerprint pattern with a high degree of accuracy.

The resistors R1a and R1b adjust drive currents passing through the light-emitting diodes LEDa and LEDb (and hence output intensities La and Lb of the light-emitting diodes LEDa and LEDb). In the personal identification device of this embodiment, the difference in sensitivity of the light receiving sensor portion 2 between when a vein pattern is read and when a fingerprint pattern is read is made up as follows. The resistance of the resistor R1b is set to be smaller than that of the resistor R1a so as to make the output intensity Lb of the light-emitting diode LEDb higher than the output intensity La of the light-emitting diode LEDa. How the output intensity is set will be described later in detail.

The driver circuit DRV controls the opening and closing of the transistors Q1a and Q1b by sending a control signal to the bases thereof based on an instruction from the controlling portion 6. More specifically, at the time of reading a vein pattern, the driver circuit DRV turns the transistor Q1a on and the transistor Q1b off, thereby feeding a drive current only to the light-emitting diode LEDa; at the time of reading a fingerprint pattern, the driver circuit DRV turns the transistor Q1a off and the transistor Q1b on, thereby feeding the drive current only to the light-emitting diode LEDb. With this drive current control, at the time of reading a vein pattern, the light-emitting diode LEDa is made to emit infrared light with a wavelength of λa; at the time of reading a fingerprint pattern, the light-emitting diode LEDb is made to emit infrared light with a wavelength of λb (see FIG. 6).

Figure 3A:
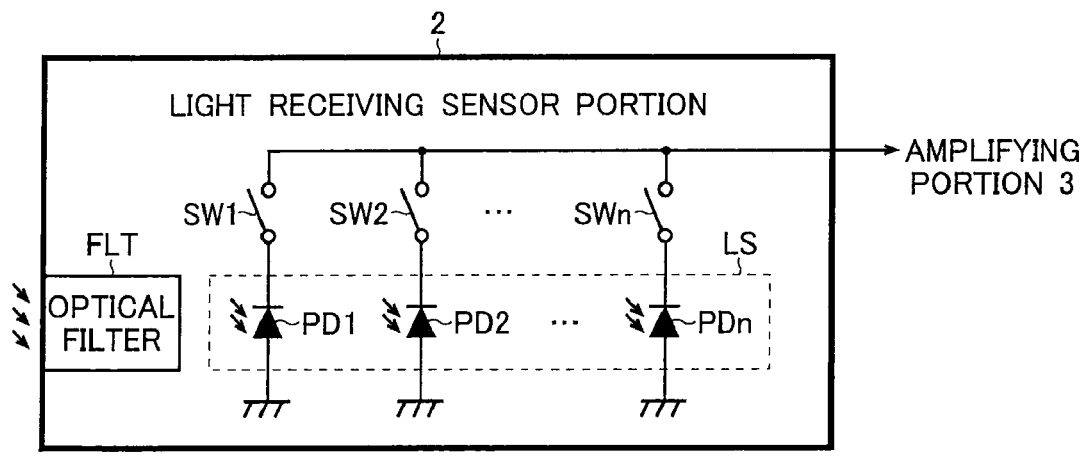
FIG. 3A is a circuit diagram showing an example of the configuration of a light receiving sensor portion 2.
Figure 3B:
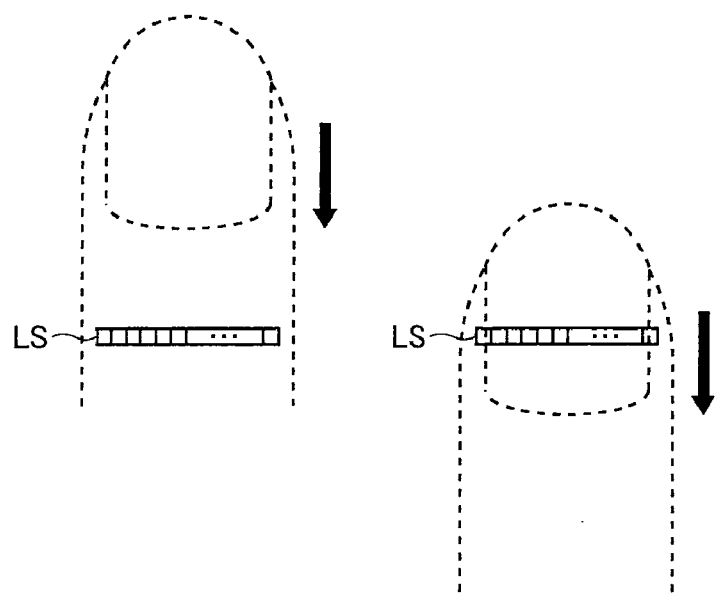
FIG. 3B is a schematic diagram showing a state in which the light receiving sensor portion 2 is used.

Next, with reference to FIGS. 3A and 3B, the configuration and operation of the light receiving sensor portion 2 will be described in detail. FIG. 3A is a circuit diagram showing an example of the configuration of the light receiving sensor portion 2, and FIG. 3B is a schematic diagram showing a state in which the light receiving sensor portion 2 is used.

As shown in FIG. 3A, the light receiving sensor portion 2 includes a line sensor LS (for example, 256 bits per line) composed of linearly-arranged n photodiodes PD1 to PDn, switches SW1 to SWn each connected between one of the photodiodes PD1 to PDn and the amplifying portion 3, and an optical filter FLT that selectively allows incident light belonging to a predetermined wavelength range to pass through the line sensor LS. Incidentally, the photodiodes PD1 to PDn are connected at their respective anodes to a common ground line.

The optical filter FLT may be provided in such a way as to coat the line sensor LS when the light receiving sensor portion 2 is modularized. In this embodiment, the optical filter FLT is set to operate at wavelengths of 700 to 950 nm, so as to block visible light but allow only infrared light to pass therethrough (see FIG. 5A, which will be described later). The characteristics of the optical filter FLT can be easily adjusted by changing, for example, the composition of resin forming the optical filter FLT.

The optical filter FLT does not necessarily have to be provided as long as the photodiodes PD1 to PDn can be formed in such a way that the light sensitivity of the light receiving sensor portion 2 peaks in the infrared wavelength range. However, for example, in a case where a photodiode for infrared communication is used as a light-receiving element of the light receiving sensor portion 2, the following problem arises. Optimizing the spectral sensitivity characteristics of the photodiodes PD1 to PDn formed as an integrated circuit requires different drawbacks attributable to many trade-offs such as a decrease in response speed to be overcome. This may lead to increased costs and trouble in development. Thus, it is preferable to use the optical filter FLT for adjusting the wavelength range of incident light that is allowed to pass through the line sensor LS.

The light receiving sensor portion 2 configured as described above detects a component of infrared light reflected from the fingertip after being shone thereon from the light source portion 1. As shown in FIG. 3B, for a fingertip that is slid so as to cross at right angles to a direction in which the line sensor LS is arranged, reading of a vein pattern and reading of a fingerprint pattern are alternately performed line by line on a time division basis at intervals of a predetermined detection period (for example, 1 ms) (see FIG. 6, which will be described later). As described above, by using the line sensor LS as the light receiving sensor portion 2, as compared with a configuration in which a two-dimensional area sensor is used, it is possible to reduce the chip area and costs. This also helps save space for mounting, and thus makes the device easily mountable onto small electronic apparatuses such as cellular phone terminals.

To finish two different types of reading, namely reading of a vein pattern and reading of a fingerprint pattern, in the same time that one of them would require, it is necessary to halve the detection time for each reading. This naturally causes the amount of light received by the light receiving sensor portion 2 to be halved. Thus, in a case where the time for reading a vein pattern and a fingerprint pattern has to be maintained as before, advisably, the output intensity of the light source portion 1 and the gain of the amplifying portion 3 are set to be roughly twice as large as the conventional ones to make up for a decrease in the amount of received light due to shortened detection time.

Figure 4:
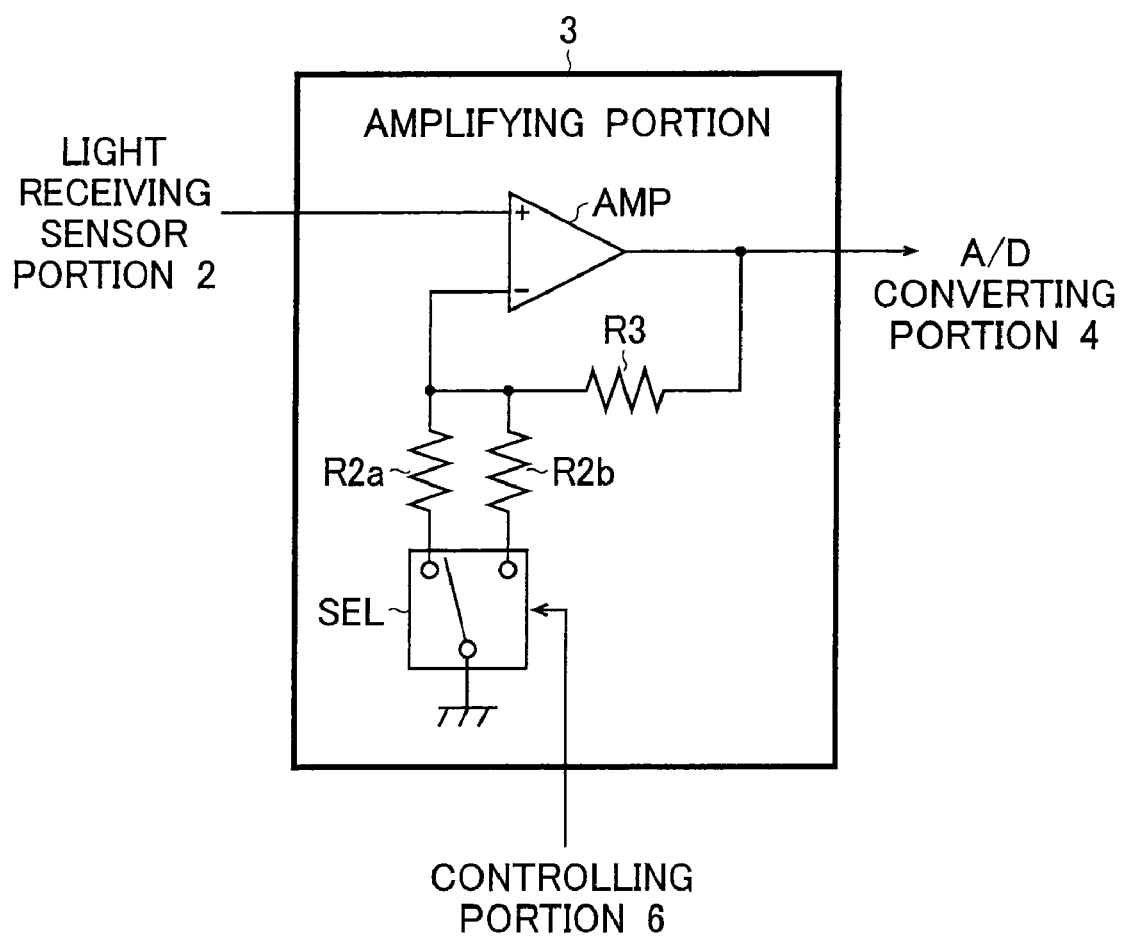
FIG. 4 is a circuit diagram showing an example of the configuration of an amplifying portion 3.

Next, with reference to FIG. 4, the configuration and operation of the amplifying portion 3 will be described in detail. FIG. 4 is a circuit diagram showing an example of the configuration of the amplifying portion 3.

As shown in this drawing, the amplifying portion 3 is a non-inverting amplifying circuit including an operational amplifier AMP, resistors R2a and R2b, a resistor R3, and a selector SEL.

The inverting input terminal (−) of the operational amplifier AMP is connected to one end of the resistor R2a, to one end of the resistor R2b, and to one end of the resistor R3. The non-inverting input terminal (+) of the operational amplifying portion is connected to an output node of the light receiving sensor portion 2. An output node of the operational amplifier AMP is connected to an input node of the A/D converting portion 4, and is connected to the other end of the resistor R3. The other end of the resistor R2a is connected to the first selection contact of the selector SLT. The other end of the resistor R2b is connected to the second selection contact of the selector SLT. The common contact of the selector SLT is connected to the ground line.

The gain of the amplifying portion 3 configured as described above is determined by the ratio of the resistor R2a or R2b to the resistor R3. More specifically, when a vein pattern is read, the selector SLT is made to select the resistor R2a, whereby the gain Ga of the amplifying portion 3 is set to 1+R3/R2a. On the other hand, when a fingerprint pattern is read, the selector SLT is made to select the resistor R2b, whereby the gain Gb of the amplifying portion 3 is set to 1+R3/R2b.

In the personal identification device of this embodiment, the difference in sensitivity of the light receiving sensor portion 2 between when a vein pattern is read and when a fingerprint pattern is read is made up as follows. The resistance of the resistor R2b is set to be smaller than that of the resistor R2a in such a way as to make the gain Gb of the amplifying portion 3 at the time of reading a fingerprint pattern higher than the gain Ga of the amplifying portion 3 at the time of reading a vein pattern. How the gain is set will be described later in detail.

Next, with reference to FIGS. 5A and 5B and FIG. 6, the spectral sensitivity characteristics of the light receiving sensor portion 3 will be described, and a detailed description will be given of LED switching control and output intensity control of the light source portion 1 and gain control of the amplifying portion 3.

Figure 5A:
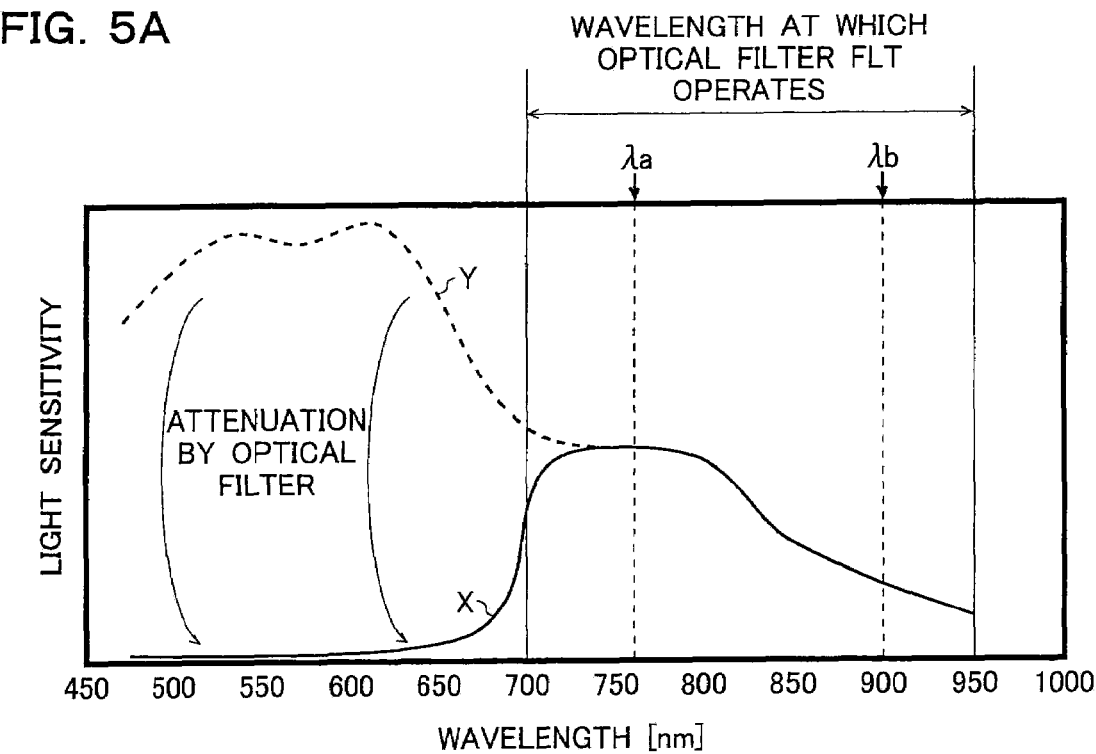
FIG. 5A is a diagram showing the spectral sensitivity characteristics of the light receiving sensor portion 2.
Figure 5B:
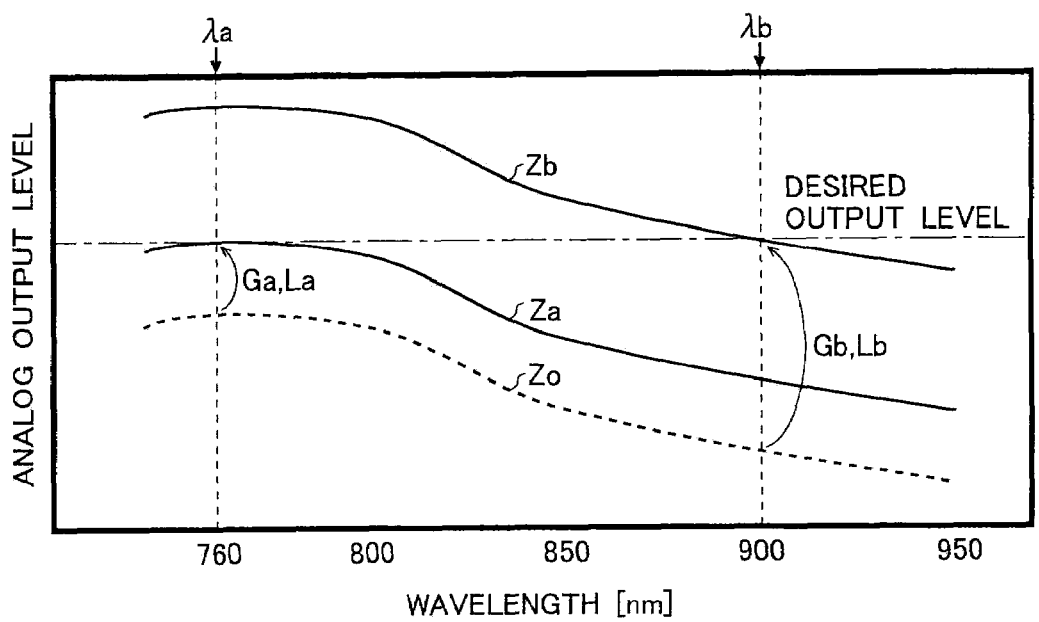
FIG. 5B is a diagram showing the analog output characteristics of the amplifying portion 3.
Figure 6:
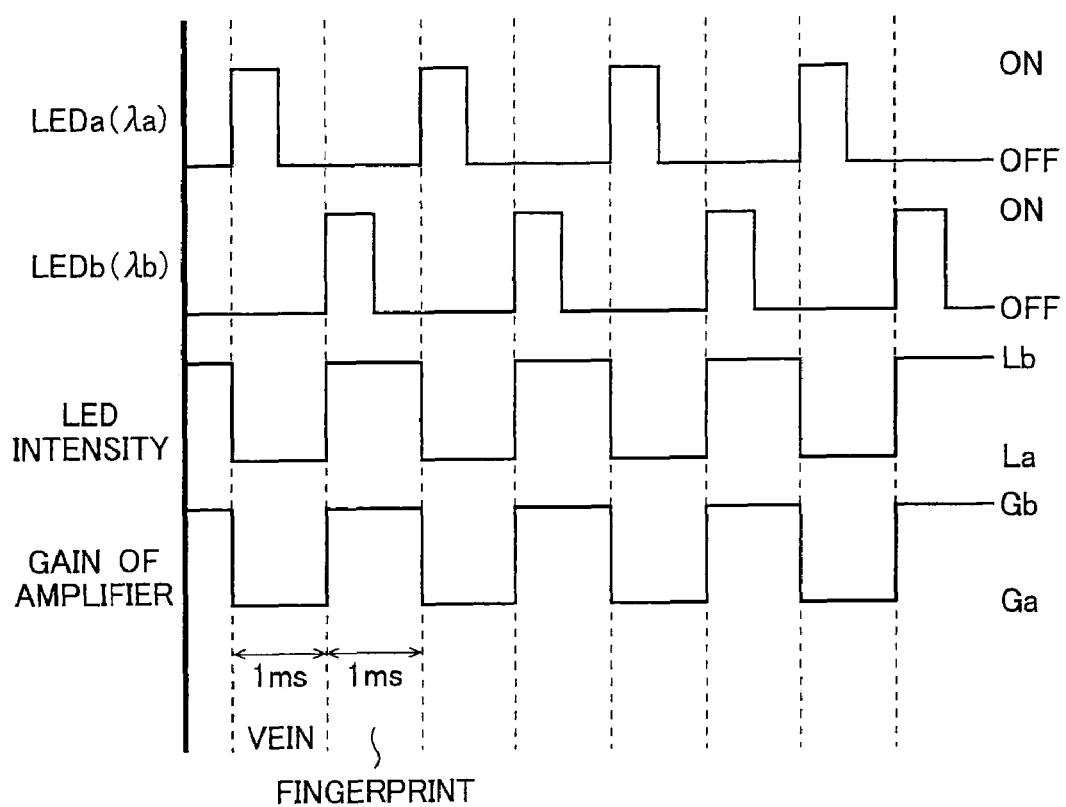
FIG. 6 is a timing chart illustrating LED switching control and output intensity control of the light source portion 1 and gain control of the amplifying portion 3.

FIG. 5A is a diagram showing the spectral sensitivity characteristics of the light receiving sensor portion 2, and FIG. 5B is a diagram showing the analog output characteristics of the amplifying portion 3. FIG. 6 is a timing chart illustrating the LED switching control and the output intensity control of the light source portion 1 and the gain control of the amplifying portion 3.

In FIG. 5A, the solid line X indicates the spectral sensitivity characteristics of the light receiving sensor portion 2 including the optical filter FLT, and the dashed line Y indicates, for comparison purposes, the spectral sensitivity characteristics of the photodiodes PD1 to PDn.

In FIG. 5B, the solid line Za and the solid line Zb indicate the analog output characteristics of the amplifying portion 3 at the time of reading a vein pattern and a fingerprint pattern, respectively. The dashed line Zo indicates, for comparison purposes, the analog output characteristics when no output intensity control of the light source portion 1 and no gain control of the amplifying portion 3 are performed.

In the personal identification device of this embodiment, the photodiodes PD1 to PDn of the light receiving sensor portion 2 are formed in the same process as a general-purpose line sensor IC used for scanners and facsimiles. As indicated by the dashed line Y of FIG. 5A, the spectral sensitivity characteristics of the photodiodes PD1 to PDn indicate that the light sensitivity thereof peaks in the visible wavelength range and decreases as the wavelength of incident light gets longer.

That is, as compared with when a vein pattern is read and infrared light with a wavelength of λa (=760 nm) is shone, when a fingerprint pattern is read and infrared light with a wavelength of λb (=900 nm) is shone, the light sensitivity of the light receiving sensor portion 2 is decreased.

Thus, in the personal identification device of this embodiment, as indicated by the solid line X of FIG. 5A, the optical filter FLT is made to attenuate the light sensitivity in the visible light range, and, as indicated by the solid line Za and the solid line Zb of FIG. 5B, the LED output intensity control of the light source portion 1 and the gain control of the amplifying portion 3 are performed in such a way as to make up the difference in sensitivity of the light receiving sensor portion 2 between when a vein pattern is read and when a fingerprint pattern is read. Specifically, as shown in FIGS. 5B and 6, switching is performed in such a way that the output intensity Lb and the gain Gb at the time of reading a fingerprint pattern is made higher than the output intensity La and the gain Ga at the time of reading a vein pattern.

With this configuration, it is possible to make up the difference in sensitivity of the light receiving sensor portion 2 between when a vein pattern is read and when a fingerprint pattern is read, and to keep the level of an output signal of the amplifying portion 3 within a predetermined tolerance level. This makes it possible to improve the accuracy of personal identification by improving the accuracy with which to read a vein pattern and a fingerprint pattern.

The embodiment described above deals with a case in which switching control is performed for both the output intensity of the light source portion 1 and the gain of the amplifying portion 3 to make up the difference in sensitivity of the light receiving sensor portion 2 between when a vein pattern is read and when a fingerprint pattern is read. This, however, is not meant to limit the configuration of the invention in any way; the invention is applicable also to a configuration in which switching control is performed for one of the output intensity and the gain.

Next, with reference to FIGS. 7 and 8, a modified example of the light source portion 1 will be described, and a detailed description will be given of output intensity control of the light source portion 1 and gain control of the amplifying portion 3.

Figure 7:
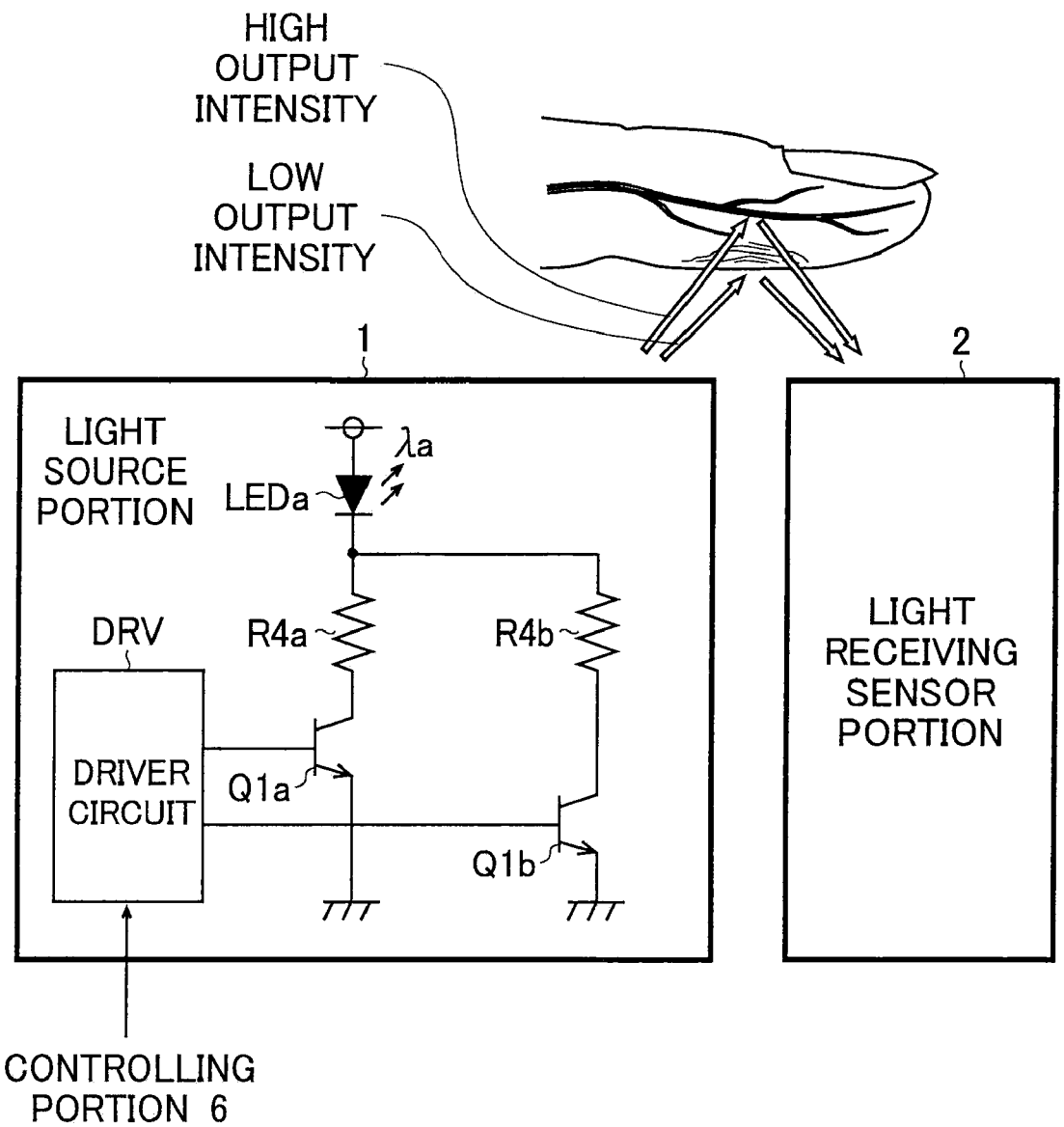
FIG. 7 is a circuit diagram showing a modified example of the light source portion 1.
Figure 8:
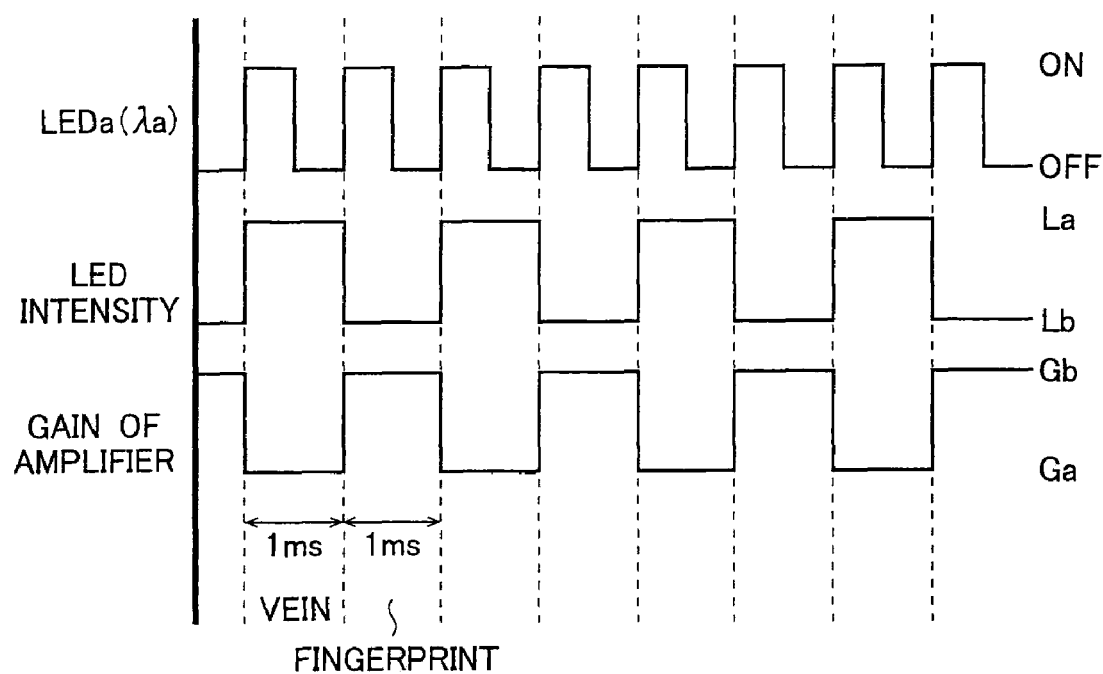
FIG. 8 is a timing chart illustrating output intensity control of the light source portion 1 and gain control of the amplifying portion 3.

FIG. 7 is a circuit diagram showing a modified example of the light source portion 1, and FIG. 8 is a timing chart illustrating the output intensity control of the light source portion 1 and the gain control of the amplifying portion 3.

As shown in FIG. 7, the light source portion 1 of this modified example includes a light-emitting diode LEDa, resistors R4a and R4b, npn bipolar transistors Q1a and Q1b, and a driver circuit DRV.

The anode of the light-emitting diode LEDa is connected to the power supply line. The cathode of the light-emitting diode LEDa is connected via the resistor R4a to the collector of the transistor Q1a, and is connected via the resistor R4b to the collector of the transistor Q1b. The emitters of the transistors Q1a and Q1b are connected to the ground line. The bases of the transistors Q1a and Q1b are connected to a control signal output node of the driver circuit DRV.

As mentioned earlier, the light-emitting diode LEDa emits infrared light (near-infrared light) with a wavelength of λa (in this embodiment, about 760 nm) suitable for reading a vein pattern.

The resistors R4a and R4b adjust a drive current passing through the light-emitting diode LEDa. In the personal identification device of this embodiment, the resistance of the resistor R4b is set to be greater than that of the resistor R4a so as to make the output intensity Lb at the time of reading a fingerprint pattern lower than the output intensity La at the time of reading a vein pattern.

The driver circuit DRV controls the opening and closing of the transistors Q1a and Q1b by sending a control signal to the bases thereof based on an instruction from the controlling portion 6. More specifically, at the time of reading a vein pattern, the driver circuit DRV turns the transistor Q1a on and the transistor Q1b off, thereby feeding a drive current to the light-emitting diode LEDa via the resistor R4a; at the time of reading a fingerprint pattern, the driver current DRV turns the transistor Q1a off and the transistor Q1b on, thereby feeding a drive current to the light-emitting diode LEDa via the resistor R4b.

Alternatively, at the time of reading a vein pattern, both the transistors Q1a and Q1b may be turned on.

With this drive current control, at the time of reading a vein pattern, infrared light with an output intensity La (an output intensity with which a component reflected from veins can be detected) is emitted; at the time of reading a fingerprint pattern, infrared light with an output intensity Lb (an output intensity with which a component reflected from veins has no influence) that is lower than the output intensity La is emitted (see FIG. 8).

As described above, in this modified example, instead of using infrared light with different wavelengths of λa and λb, by using only infrared light with a wavelength of λa suitable for reading a vein pattern while changing the output intensity thereof, both a vein pattern and a fingerprint pattern are read. With this configuration, it is possible to reduce the number of light-emitting diodes of the light source portion 1. This contributes to miniaturization of the device and cost reduction.

In the personal identification device of this modified example, as shown in FIG. 8, the gain of the amplifying portion 3 is switched in such a way as to make up the difference in output intensity of the light source portion 1 between when a vein pattern is read and when a fingerprint pattern is read. More specifically, switching is performed in such a way that the gain Gb at the time of reading a fingerprint pattern is made higher than the gain Ga at the time of reading a vein pattern.

With this configuration, it is possible to make up the difference in output intensity of the light source portion 1 between when a vein pattern is read and when a fingerprint pattern is read, and to keep the level of an output signal of the amplifying portion 3 within a predetermined tolerance level. This makes it possible to improve the accuracy of personal identification by improving the accuracy with which to read a vein pattern and a fingerprint pattern.

The invention may be practiced in any other manner than specifically described above, with any modification or variation made within the spirit of the invention.

For example, the embodiment described above deals with a case in which the line sensor LS is used as the light receiving sensor portion 2. This, however, is not meant to limit the configuration of the invention in any way; it is also possible to use a two-dimensional area sensor. Alternatively, with a configuration in which two or more arrays of line sensors LS are provided, it is possible to detect a movement of the fingertip. This helps further improve the accuracy of reading.

The invention offers the following advantages: it helps realize an improvement in the accuracy of personal identification by improving the accuracy with which to read a fingerprint pattern and a blood vessel pattern.

In terms of industrial applicability, personal identification devices according to the invention are useful as a method of authentication for use in automatic teller machines, electronic commerce systems, door lock systems for homes and automobiles, and cellular phone terminals.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A personal identification device comprising:
    a light source portion that emits infrared light with a first wavelength at a time of reading a blood vessel pattern, and emits infrared light with a second wavelength longer than the first wavelength at a time of reading a fingerprint pattern;
    a light receiving sensor portion that detects a component of the infrared light reflected from a fingertip after being shone thereon from the light source portion;
    an amplifying portion that amplifies a detection signal obtained by the light receiving sensor portion;
    an analog/digital converting portion that converts an analog signal obtained by the amplifying portion into a digital signal;
    a data distributing portion that distributes the digital signal obtained by the analog/digital converting portion into two groups of data, of which one is blood vessel pattern data and the other is fingerprint pattern data; and
    a processing portion that verifies an identity of a person based on the blood vessel
    pattern data and the fingerprint pattern data distributed by the data distributing portion,
    wherein the light source portion comprises an intensity switching portion that switches an output intensity of the light source portion in such a way as to make up a difference in sensitivity of the light receiving sensor portion between when a blood vessel pattern is read and when a fingerprint pattern is read.

2. A personal identification device comprising:
    a light source portion that emits infrared light with a first wavelength at a time of reading a blood vessel pattern, and emits infrared light with a second wavelength longer than the first wavelength at a time of reading a fingerprint pattern;

a light receiving sensor portion that detects a component of the infrared light reflected from a fingertip after being shone thereon from the light source portion;

an amplifying portion that amplifies a detection signal obtained by the light receiving sensor portion;

an analog/digital converting portion that converts an analog signal obtained by the amplifying portion into a digital signal;

a data distributing portion that distributes the digital signal obtained by the analog/digital converting portion into two groups of data, of which one is blood vessel pattern data and the other is fingerprint pattern data; and a processing portion that verifies an identity of a person based on the blood vessel pattern data and the fingerprint pattern data distributed by the data distributing portion, wherein the amplifying portion comprises a gain switching portion that switches a gain of the amplifying portion in such a way as to make up a difference in sensitivity of the light receiving sensor portion between when a blood vessel pattern is read and when a fingerprint pattern is read.

3. The personal identification device of claim 1, wherein the light receiving sensor portion is a line sensor composed of a plurality of light-receiving elements that are linearly arranged in at least one array, wherein reading of a blood vessel pattern and reading of a fingerprint pattern are alternately performed by the line sensor on a time division basis.

4. The personal identification device of claim 1, wherein the processing portion comprises:

a first data storing portion that stores the blood vessel pattern data obtained as a result of signal distribution by the data distributing portion;

a second data storing portion that stores the fingerprint pattern data obtained as a result of signal distribution by the data distributing portion;

a first feature extracting portion that extracts a blood vessel pattern feature from the blood vessel pattern data stored in the first data storing portion;

a second feature extracting portion that extracts a fingerprint pattern feature from the fingerprint pattern data stored in the second data storing portion;

a first registering portion that stores a registered blood vessel pattern feature;

a second registering portion that stores a registered fingerprint pattern feature;

a first checking portion that checks the blood vessel pattern feature against the registered blood vessel pattern feature;

a second checking portion that checks the fingerprint pattern feature against the registered fingerprint pattern feature;

a first determining portion that determines a similarity in blood vessel pattern based on checking results obtained by the first checking portion;

a second determining portion that determines a similarity in fingerprint pattern based on checking results obtained by the second checking portion; and a final determining portion that verifies an identity of a person based on determination results obtained by the first determining portion and the second determining portion.

5. The personal identification device of claim 1, wherein the light source portion, the light receiving sensor portion, the amplifying portion, and the analog/digital converting portion are integrated into a single semiconductor integrated circuit device.

6. A personal identification device comprising:

a light source portion that emits infrared light with a first output intensity at a time of reading a blood vessel pattern, and emits infrared light with a second output intensity lower than the first output intensity at a time of reading a fingerprint pattern;

a light receiving sensor portion that detects a component of the infrared light reflected from a fingertip after being shone thereon from the light source portion;

an amplifying portion that amplifies a detection signal obtained by the light receiving sensor portion;

an analog/digital converting portion that converts an analog signal obtained by the amplifying portion into a digital signal;

a data distributing portion that distributes the digital signal obtained by the analog/digital converting portion into two groups of data, of which one is blood vessel pattern data and the other is fingerprint pattern data; and a processing portion that verifies an identity of a person based on the blood vessel pattern data and the fingerprint pattern data distributed by the data distributing portion.

7. The personal identification device of claim 6, wherein the amplifying portion comprises a gain switching portion that switches a gain of the amplifying portion in such a way as to make up a difference in output intensity of the light source portion between when a blood vessel pattern is read and when a fingerprint pattern is read.

8. The personal identification device of claim 6, wherein the light receiving sensor portion is a line sensor composed of a plurality of light-receiving elements that are linearly arranged in at least one array, wherein reading of a blood vessel pattern and reading of a fingerprint pattern are alternately performed by the line sensor on a time division basis.

9. The personal identification device of claim 6, wherein the processing portion comprises:

a first data storing portion that stores the blood vessel pattern data obtained as a result of signal distribution by the data distributing portion;

a second data storing portion that stores the fingerprint pattern data obtained as a result of signal distribution by the data distributing portion;

a first feature extracting portion that extracts a blood vessel pattern feature from the blood vessel pattern data stored in the first data storing portion;

a second feature extracting portion that extracts a fingerprint pattern feature from the fingerprint pattern data stored in the second data storing portion;

a first registering portion that stores a registered blood vessel pattern feature;

a second registering portion that stores a registered fingerprint pattern feature;

a first checking portion that checks the blood vessel pattern feature against the registered blood vessel pattern feature;

a second checking portion that checks the fingerprint pattern feature against the registered fingerprint pattern feature;

a first determining portion that determines a similarity in blood vessel pattern based on checking results obtained by the first checking portion;

a second determining portion that determines a similarity in fingerprint pattern based on checking results obtained by the second checking portion; and a final determining portion that verifies an identity of a person based on determination results obtained by the first determining portion and the second determining portion.

10. The personal identification device of claim 6, wherein the light source portion, the light receiving sensor portion, the amplifying portion, and the analog/digital converting portion are integrated into a single semiconductor integrated circuit device.

11. An electronic apparatus provided with a personal identification device, wherein the personal identification device comprises:

a light source portion that emits infrared light with a first wavelength at a time of reading a blood vessel pattern, and emits infrared light with a second wavelength longer than the first wavelength at a time of reading a fingerprint pattern;

a light receiving sensor portion that detects a component of the infrared light reflected from a fingertip after being shone thereon from the light source portion;

an amplifying portion that amplifies a detection signal obtained by the light receiving sensor portion;

an analog/digital converting portion that converts an analog signal obtained by the amplifying portion into a digital signal;

a data distributing portion that distributes the digital signal obtained by the analog/digital converting portion into two groups of data, of which one is blood vessel pattern data and the other is fingerprint pattern data; and a processing portion that verifies an identity of a person based on the blood vessel pattern data and the fingerprint pattern data distributed by the data distributing portion, and wherein the light source portion comprises an intensity switching portion that switches an output intensity of the light source portion in such a way as to make up a difference in sensitivity of the light receiving sensor portion between when a blood vessel pattern is read and when a fingerprint pattern is read.

12. An electronic apparatus provided with a personal identification device, wherein the personal identification device comprises:

a light source portion that emits infrared light with a first output intensity at a time of reading a blood vessel pattern, and emits infrared light with a second output intensity lower than the first output intensity at a time of reading a fingerprint pattern;

a light receiving sensor portion that detects a component of the infrared light reflected from a fingertip after being shone thereon from the light source portion;

an amplifying portion that amplifies a detection signal obtained by the light receiving sensor portion;

an analog/digital converting portion that converts an analog signal obtained by the amplifying portion into a digital signal;

a data distributing portion that distributes the digital signal obtained by the analog/digital converting portion into two groups of data, of which one is blood vessel pattern data and the other is fingerprint pattern data; and a processing portion that verifies an identity of a person based on the blood vessel pattern data and the fingerprint pattern data distributed by the data distributing portion.

* * * * *